(12) United States Patent
Kikkawa

(10) Patent No.: US 8,424,353 B2
(45) Date of Patent: Apr. 23, 2013

(54) WELDER FOR METAL ROLLING SYSTEM, METAL ROLLING SYSTEM, AND METAL ROLLING METHOD

(75) Inventor: Tanehiro Kikkawa, Kanagawa (JP)

(73) Assignee: JP Steel Plantech Co., Yokohama-Shi, Kanagawa (JP)

( * ) Notice: Subject to any disclaimer, the term of this patent is extended or adjusted under 35 U.S.C. 154(b) by 468 days.

(21) Appl. No.: 12/738,892

(22) PCT Filed: Oct. 20, 2008

(86) PCT No.: PCT/JP2008/068980
§ 371 (c)(1), (2), (4) Date: Apr. 20, 2010

(87) PCT Pub. No.: WO2009/051257
PCT Pub. Date: Apr. 23, 2009

(65) Prior Publication Data
US 2010/0218579 A1     Sep. 2, 2010

(30) Foreign Application Priority Data

Oct. 20, 2007 (JP) ................................. 2007-273253

(51) Int. Cl.
*B21B 1/38* (2006.01)
(52) U.S. Cl.
USPC ......................................................... 72/203

(58) Field of Classification Search ............ 72/6.2–14.7, 72/199–252.5; 219/91.2, 87
See application file for complete search history.

(56) References Cited

U.S. PATENT DOCUMENTS

2008/0072646 A1* 3/2008 Domschot ........................ 72/239
2011/0061436 A1* 3/2011 Greenwood .................... 72/203

FOREIGN PATENT DOCUMENTS

| EP | 1 844 889 A1 | 10/2007 |
| JP | 06-023559 A | 2/1994 |
| JP | 2721716 B2 | 11/1997 |
| JP | 2771101 B2 | 4/1998 |
| JP | 11-342402 A | 12/1999 |
| JP | 2006-334647 A | 12/2006 |

OTHER PUBLICATIONS

Extended European Search Report (EESR) dated Jun. 16, 2011 (in English) in counterpart European Application No. 08839073.7.
International Search Report dated Jan. 27, 2009 issued in International Appln. No. PCT/JP2008/068980.

* cited by examiner

*Primary Examiner* — Faye Francis
(74) *Attorney, Agent, or Firm* — Holtz, Holtz, Goodman & Chick, P.C.

(57) ABSTRACT

A welder for a metal rolling system, which is disposed in the metal rolling system and is configured to perform spot-welding on a product strip, includes a back bar disposed below the pass line and welding guns disposed above the pass line to perform series welding for welding a plurality of points at one time.

18 Claims, 9 Drawing Sheets

WELDER FOR METAL ROLLING SYSTEM, METAL ROLLING SYSTEM, AND METAL ROLLING METHOD

This application is a U.S. National Phase Application under 35 USC 371 of International Application PCT/JP2008/068980 filed Oct. 20, 2008.

TECHNICAL FIELD

As defined by the claims, the present invention, which relates to metal rolling performed by causing a product strip (strip to be rolled) to pass through a rolling mill back and forth in a reversible rolling mill, is to provide a welder for a metal rolling system, a metal rolling system equipped with the welder, and a metal rolling method.

BACKGROUND ART

In the case of reversible rolling on a product strip by use of a reversible rolling mill, the rolling is performed with the rolling mill (mill proper body), equipped with an unwinder (pay-off reel) disposed on the entry side, and a winder disposed on each of the entry side and the delivery side. The front end portion of the strip is wound and held on the delivery side winder by two or three turns made at the beginning of the first pass rolling, and then the rear end portion of the strip is wound and held on the entry side winder by two or three turns made at the beginning of the second pass rolling, so that the rolling is performed while tension is given to the strip. Then, the rolling is performed by a plurality of passes made back and forth while the front end portion and rear end portion are kept held on the winders. After the strip is processed to a predetermined thickness by a predetermined number of passes of rolling, the strip is unloaded as a coil from one of the winders. The strip includes parts not to be product, which are off-gauge parts, at the front end portion and rear end portion because they are not rolled, and so these parts are cut off and discarded immediately before unloading or in the subsequent step.

The off-gauge parts generated at both end portions of the strip in the longitudinal direction bring about a loss in the strip as described above, and so they are preferably to be set as short as possible in light of the yield ratio. Patent Document 1 listed below discloses a metal rolling method arranged to reduce such a loss and thereby improve the yield ratio.

According to the method disclosed in Patent Document 1, a leader strip is held by the winder on the delivery side or on the entry side, and is welded to the front end portion or rear end portion of a product strip, so that the product strip is rolled by the rolling mill nearly up to the end portion thereof while tension is given from the winder through the leader strip. Specifically, as shown in FIG. 12, (a) to (f), a product strip A is wound off from a coil (hot coil) CR1 attached to the unwinder 2, and is subjected to reversible rolling between a rolling mill 1 and winders 3 and 4, in accordance with the following steps.

a) At first, the front end portion (delivery side end portion) of the product strip A is wound off from the unwinder 2. When the front end portion reaches the position of a welder 12', this front end portion and an end portion of a leader strip Y, which has been wound off from the delivery side winder 4, are overlapped with each other and spot-welded to each other by the welder 12' (FIG. 12, (a)).

b) Then, the welded part Yc formed by the spot-welding is unwound to a position near the rolling mill 1, and the rolls of the rolling mill 1 are closed to start the first pass rolling (FIG. 12, (b)).

c) The rolling is performed while tension is given to the product strip A by the winder 4 and the other winders. When the rear end portion of the product strip is separated from the unwinder 2, the strip press 15' is used to give tension to the product strip A (FIG. 12, (c)).

d) When the rear end portion (entry side end portion) of the product strip A reaches the position of the welder 11', a leader strip X is unwound from the entry side winder 3. The rear end portion of the product strip A and the leader strip X are overlapped with each other at the welder 11' and welded to each other by the welder 11' (FIG. 12, (d)).

e) Then, the rolling is performed while tension is given by the entry side winder 3 until the welded part Xc reaches a position near the rolling mill 1, thereby finishing the first pass rolling. Then, the second pass rolling and the subsequent even ordinal number passes of rolling are performed while tension is given by the delivery side winder 4 until the welded part Yc between the product strip A and leader strip Y reaches a position near the rolling mill 1 (FIG. 12, (e)).

f) The third pass rolling and subsequent odd ordinal number passes of rolling are performed while tension is given to the product strip A, as described above, until the welded part Xc reaches a position near the rolling mill 1 again (FIG. 12, (f)).

As described above, odd ordinal number passes of rolling and even ordinal number passes of rolling are repeated to perform reverse rolling until the product strip A is processed to a predetermined thickness. After the rolling is completed, the coil of the product strip is unloaded either from the entry side or delivery side winder. In FIG. 12, reference symbols 13' and 14' denote cutters.

Where the metal rolling is performed as described above, since the leader strips are welded to the end portions of the product strip in the longitudinal direction (i.e., portions hard to roll with tension given thereto), most of the product strip is subjected to the rolling, whereby the loss is reduced. Further, since the rolling is performed while tension is given from the winders through the leader strips, other advantages, such that the feed of the product strip becomes stable without meanderings, and the product is formed accurately in shape and thickness, are brought about.

[Patent Document 1]
Jpn. Pat. Appln. KOKAI Publication No. 2006-334647

Patent Document 1 mentioned above discloses a method for reducing the off-gauge part loss in strip metal rolling performed by use of a reversible rolling mill, thereby improving the yield ratio, but this method cannot provide the most advantageous measure in light of the productivity as well. Where the leader strips are attached to both of the front end portion and rear end portion, the yield ratio is remarkably improved, but, on the other hand, it takes time to treat the leader strips left inside the coil, thereby deteriorating the productivity. In other words, conventionally, no optimum sequence for maximizing the productivities has been found in association with the welding and subsequent separation of leader strips. Further, for example, no specific welder or optimized welder has been provided to weld a leader strip to a product strip.

DISCLOSURE OF INVENTION

Problem(s) to be Solved

Under the circumstances described above, objects of the present invention defined by the claims are to provide welders optimized to perform strip metal rolling, and to provide a metal rolling method that includes the most advantageous sequence for strip metal rolling in association with the welding and subsequent separation of a leader strip.

Means for Solving the Problems(s)

According to the present invention, a welder is provided for a metal rolling system, which is disposed in the metal rolling system and is configured to perform spot-welding on a product strip, comprising: a back bar disposed below the pass line (the passage route of the product strip) and welding guns (a welding mechanism including electrodes, electric feeder members for the same, and so forth) disposed above the pass line to perform series welding for welding a plurality of points at one time. The series welding is performed by spot-welding including two or more welding points (nugget) connected in series in one welding current circuit. For example, the series welding is performed such that two electrodes are set in contact with one side of a pair of strips to be welded, and a back bar made of a metal having a high conductivity is set in contact with the other side.

The welder for a metal rolling system described above provides preferable actions and effects set out below where it is used in strip metal rolling to weld a product strip.

Since the welder is of a spot-welder, the system cost is lower and the production efficiency of the entire rolling process is higher because of a shorter time necessary for welding.

Since the welding guns are disposed above the pass line to perform series welding, a cooling liquid, roll coolant, used for the rolling rolls hardly flows into the mechanical parts and electric current-carrying parts of the welding guns. Consequently, even if the water proofing means or the like for the welding guns is simplified, it is possible to reliably prevent troubles, such as electric leakage caused by the cooling liquid. Although the back bar is disposed below the pass line, no problem arises when the cooling liquid comes into contact with or flows onto the back bar.

Since the back bar is used as described above to perform series welding, spot-welding can be performed on at least two points at one time. This is advantageous for swiftly welding a large number of places. When the product strip is connected to another strip, it is required to provide a plurality of welding points, thereby making a weld strength necessary for them in relation to their dimensions and mechanical load (tensile and/or bending stresses act on the welded part). The arrangement of the back bar allows the welding to be efficiently performed to satisfy the requirements described above.

The welder according to the present invention is preferably designed such that the back bar is fixedly disposed below the pass line, and the welding guns are disposed along with an electrical transformer and an elevator for the welding guns above the pass line, and the welding guns are arranged to apply welding on the plurality of points distributed at two or more positions in a longitudinal direction of the product strip (the number of welding guns is set to apply welding on the plurality of points at one time or the welding guns are disposed movable).

This arrangement is advantageous, as follows.

Since the welding guns are disposed along with the elevator and electrical transformer for the welding guns above the pass line and only the back bar is fixedly disposed below the pass line, the cooling liquid described above hardly flows into any of the mechanical parts and electric current-carrying parts used for welding. Consequently, the water proofing structure or the like can be easily simplified to reduce the cost of the welder.

Since the welding guns disposed as described above are used to perform series welding on two or more positions in the longitudinal direction of the product strip at one time, the weld strength between welded strips in a metal rolling system is advantageously improved. In the metal rolling system, a bending stress is given to the product strip in the longitudinal direction of the strip when it comes into contact with various rolls or when the coils are being wound up. Even where a number of points are welded in the width direction of the strip, if only one point is welded in the longitudinal direction (arrayed in one row), the welded part can be easily torn up because it can hardly resist bending stress given in the longitudinal direction of the strip as described above. In this respect, where two or more points (two rows) are welded in the longitudinal direction of the product strip, the welded part can well resist a bending stress frequently caused in the metal rolling system as described above and thus is advantageously improved in strength.

It is preferable that the welding guns are retractable to a position distant (upward or sideward) from the pass line when performing no welding, and are disposed along with a thickness gauge configured to measure a thickness of the product strip, as described below. Specifically the thickness gauge is preferably disposed to measure a thickness of the product strip near the pass line and is retractable to a position distant sideward from the pass line when performing no measurement, with such a positional relationship that a position of the thickness gauge for performing the measurement overlaps with a position of the welding guns for performing the welding (the position of the thickness gauge for performing the measurement at least partly overlaps with the position of the welding guns for performing the welding).

Where the thickness gauge and welder described above are arranged to have such an overlapping positional relationship, their installation space is reduced, whereby the metal rolling system can be compact with a smaller stretch in the longitudinal direction of rolling. Therefore, the stretch of the metal rolling system in the rolling direction is smaller, and so the off-gauge part unprocessed by rolling is shorter when no leader strip is used; which is advantageous in the product yield ratio. Further, where the installation space of the welder is reduced, the welder according to the present invention can be installed in an existing metal rolling system without changing the position of winders and so forth.

Although the position of the thickness gauge for performing the measurement overlaps with the position of the welding guns for performing the welding, this arrangement does not deteriorate their functions at all. This is because the thickness gauge measures the thickness of the product strip while the product strip is being fed and subjected to rolling. On the other hand, the welder applies welding on the product strip when the feed of the product strip is stopped. Accordingly, the thickness gauge and the welding guns perform measurement and welding infallibly with different timings at their operating positions described above. When they are not used for measurement or welding, they are moved to their retracted positions separated from the pass line (or the product strip) so as not to interfere with the functions each other.

In general, the thickness gauge is subjected to calibration operations (such as zero point adjustment calibration) at a position where it has been retracted sideward or the like from the pass line. This is because the calibration operations are performed by use of a sample material prepared in advance, without using the product strip on the pass line. The calibration operations of the thickness gauge are preferably performed once for each coil, although it depends on the accuracy required on the product thickness. Since the calibration operations are performed in a period of time necessary for replacing a coil with new one, the rolling down time is the same as that of a case where no calibration operations are performed, and thus the down time cannot be prolonged so much.

In actual running operations based on the present invention, a leader strip or the like is welded to a product strip by the welder before rolling is started on this specific product strip, for example. During this welding, the calibration operations are performed on the thickness gauge, which has been retracted to a position distant from the pass line. In other word, the welding by the welder and the calibration operations for the thickness gauge can be performed at the same time, and so the rolling down time is the same as that of a case excluding the welding and calibration operations, and thus the down time cannot be prolonged so much. Further, in this case, there is a merit such that the time necessary for the coil replacement is shortened to a great extent. This merit will be explained later.

The present invention is to provide a metal rolling system (reversible metal rolling system) including a rolling mill and a winder disposed on each of an entry side and a delivery side of the rolling mill, the metal rolling system comprising the welder according to any one of the paragraphs described above, which is disposed between the winder on the entry side or delivery side and the rolling mill, along with a cutter for separating a leader strip from a product strip after the leader strip held by the winder on the delivery side is welded to an end portion of the product strip.

The "rolling mill" recited in the claims means a facility with one stand or a plurality of stands, or a rolling mill group comprising at least one facility, wherein the type of machine and the number of rolls are not specifically limited. Further, the "entry side" means a side where a coil is first loaded and product strips are wound off therefrom, and the "delivery side" means a side opposite to the entry side with the rolling mill interposed therebetween.

In this metal rolling system, the leader strip is suitably welded to the product strip by the welder described above according to the present invention. The leader strip is held by the delivery side winder while the rolling is performed with an even ordinal number pass toward the entry side used as the final pass, and then the product strip is unloaded as a coil from the entry side winder. Consequently, the loss generated at the end portion of the product strip near the delivery side is reduced and the running operations can be efficiently performed. This efficiency is due to the fact that the leader strip welded to the delivery side end portion can be kept held by the delivery side winder, and can be used as it is on this winder when it is welded to the delivery side end portion of the next product strip. In other words, there is no need to detach the leader strip from the delivery side winder or to attach the leader strip to this winder again (specifically to the winding shaft); which is very advantageous in the running operation efficiency.

The present invention is to provide a metal rolling method for rolling a product strip by use of a rolling mill and a winder disposed on each of an entry side and a delivery side of the rolling mill, while causing the product strip to pass through the rolling mill back and forth, the method comprising:

welding a leader strip held by the winder on the delivery side to an end portion of the product strip, and subjecting the product strip to reversible rolling by the rolling mill without rolling the leader strip and a welded part of the product strip to the leader strip, while giving tension from the winder on the delivery side through the leader strip to the product strip even near the end portion thereof; and cutting (separating) the leader strip at a position out of the welded part at an ending of an even ordinal number pass toward the winder on the entry side, and winding up the product strip including the welded part at the end portion onto the winder on the entry side without cutting out the welded part, followed by unloading a coil of the product strip thus wound up.

In this metal rolling method, the leader strip is used while it is welded to the end portion of the product strip in the longitudinal direction, as in the conventional metal rolling method shown in FIG. 12, and so most of the product strip is subjected to the rolling, whereby the loss of the product strip is reduced. Further, since the rolling is performed while tension is given from the winder through the leader strip, other advantages, such that the feed of the product strip becomes stable, and the product is formed accurately in shape and thickness, are brought about.

Particularly, in this method, an even ordinal number pass toward the entry side winder is used as the final pass, and the leader strip is cut and separated at the ending of this pass. Consequently, the loss generated at the end portion of the product strip near the delivery side is reduced and the running operations can be efficiently performed. In this case, unlike a case where an odd ordinal number pass toward the delivery side winder is used as the final pass, the leader strip welded to the delivery side end portion can be kept held by the delivery side winder, and can be used as it is on this winder when it is welded to the delivery side end portion of the next product strip. In other words, there is no need to detach the leader strip from the delivery side winder or to attach the leader strip to this winder again (specifically to the winding shaft); which is very advantageous in the running operation efficiency.

Further, in this method, the leader strip is cut thereon at a position out of the welded part to the product strip, and the product strip including the welded part at the end portion is wound up onto the entry side winder and is then unloaded without cutting out the welded part. Particularly, this arrangement provides the following effects: a) There is no need to dispose a system for treating the welded part on the rolling line, and so the metal rolling system can be short and simple. b) The welded part is treated not on the rolling line but offline, during which the next product strip can be caused to pass through the rolling line for rolling (or preparation thereof), whereby the productivity is improved. For example, a coil of the product strip including the welded part is unloaded from the entry side winder, and then separation of the welded part is performed while the coil is supported on a coil carriage or the like. While this operation is performed, the next product strip is supplied from the pay-off reel to the rolling line, so that the rolling is performed without a delay due to removal of the weld; which is obviously preferable.

It is preferable to perform said welding the leader strip to the end portion of the product strip and said cutting the leader strip thereafter by a welder and a cutter disposed between the rolling mill and the winder on the delivery side or between the rolling mill and the winder on the entry side.

Where said welding and cutting are performed between the rolling mill and delivery side winder, the following merits are obtained: After the leader strip is welded to the end portion (front end portion) of the product strip, the rolling can be started in a short time along with little feed of the product strip thus welded. Further, after the leader strip is cut, the leader strip can be welded to the end portion of the next product strip along with little feed of the leader strip thus cut (see an example of FIG. 1 described later). On the other hand, where said welding and cutting are performed between the rolling mill and entry side winder, the following merits are obtained: After the leader strip is cut, the product strip processed by rolling can be wound up onto the entry side winder in a short time. Further, the leader strip thus cut can be welded to the next product strip along with a small feed of the next product strip. For the reasons described above, the production efficiency can be improved in either case.

It is preferable that, after said cutting the leader strip and said winding up the product strip onto the winder on the entry side and before cutting out the welded part from the coil of the product strip, the method comprises feeding another product strip from a pay-off reel on the entry side toward the delivery side (toward the rolling mill and the farther delivery side winder).

In the metal rolling method according to the present invention, as described above, the product strip including the welded part at the end portion is wound up onto the entry side winder and then unloaded, and thus the welded part is treated not on the rolling line but offline, whereby some merits are obtained in relation to the system and efficiency. However, the efficiency can be prominent by feeding another product strip from the pay-off reel on the entry side to the rolling line before cutting out the welded part from the wound up coil on the entry side winder as described above. This is because, after the rolling for the preceding product strip is finished and the leader strip is cut, the rolling for the next product strip can be started in a very short time independently from the treatment of the welded part. It is advantageous to make some preparation in advance, e.g., to feed the front edge of the product strip to a position near the front edge of the delivery table shown in FIG. 3 (a position closer to the delivery side, which does not interfere with the rolling for the preceding product strip), so that the rolling for the next product strip can be started much more quickly.

The metal rolling method according to the present invention is particularly advantageous in a case where, after sequentially subjecting a plurality of product strips one by one to said reversible rolling and said unloaded while using the same leader strip, and then once taking out the leader strip from the winder on the delivery side (with a timing when the leader strip is used up, a roll is replaced, etc.), the method comprises:

holding an end portion of one product strip directly by the winder on the delivery side without using a leader strip, and subjecting said one product strip to reversible rolling by the rolling mill while giving tension from the winders (on the delivery side and entry side); and cutting said one product strip held by the winder on the delivery side at an ending of an even ordinal number pass toward the winder on the entry side, thereby obtaining from said one product strip a leader strip to be used for another plurality of product strips subsequently subjected to rolling.

Said one product strip subjected to rolling by use of no leader strip is preferably a wider strip (with a maximum width processible by rolling in the rolling mill or a width close to it) to maintain the flatness of the rolling rolls and product strip. Further, said one product strip is preferably cut to leave a strip part held by the delivery side winder as a leader strip to be used for a number of product strips subsequently subjected to the rolling, so that the strip part thus left has a length of ten and several meters that can be used repeatedly for the welding and cutting as described above.

Where one product strip is subjected to the rolling and then cut to provide a leader strip as described above, the metal rolling method according to the present invention can reduce the cost necessary for leader strips and handling thereof. Specifically, there is no need to prepare strips to be used as leader strips or to perform operations for holding such a strip by the delivery side winder and welding it to the front end portion of the first product strip. Further, since the strip part thus left is repeatedly used as a leader strip for a plurality of product strips thereafter, it is possible to provide repetition with the loss reduced and the productivity improved.

The rolling for the wider strip is performed as rolling for a thicker gauge product finished by four passes in such a way that a strip of a width of 1,219 mm, having an initial thickness of 2.5 mm, is rolled to a strip of a thickness of 1.0 mm. In this case, by the time (the third pass) immediately before the final pass, the strip is rolled to have a thickness in the range of 1.2 to 1.6 mm, and so the leader strip of the same thickness is used. As shown in Table 1, which shows the strength of the welding of the leader strip and product strip, a leader strip having a strip thickness of 1.2 to 1.6 mm has a high weld strength. If the number of welding spots is not changed according to the strip thicknesses, the safety ratio remains high and thus it is advantageous. Further, using a leader strip having a thickness of 1.2 to 1.6 mm is also as advantageous in terms of the yield ratio as using a leader strip having an approximate thickness of 2.5 mm.

The welding described above, used in the metal rolling method according to the present invention, is preferably performed by use of a spot-welder comprising a back bar disposed below the pass line and welding guns disposed above the pass line to perform series welding on a plurality of points at one time.

With this arrangement, it is possible to perform preferable welding suitable for rolling between the leader strip and the end portion of the product strip, while utilizing the merit of the welder for a metal rolling system described above.

EXPLANATION OF REFERENCE SYMBOLS

1: Rolling machine (mill proper body)
2: Unwinder (pay-off reel)
3: Entry side winder (tension reel)
4: Delivery side winder (tension reel)
5: Pinch roll
5B: Delivery table
6: Cutter (shear or shearing machine)
7: Strip press
10: Welder
11: Welding gun
12: Transformer
13: Elevator (retraction cylinder)
16: Back bar
20: Thickness gauge
30: Strip holding member
A: Product strip (strip to be rolled)
L: Leader strip (leader strip)
Lc: Welded part

BEST MODE FOR CARRYING OUT THE INVENTION

Figure 1:
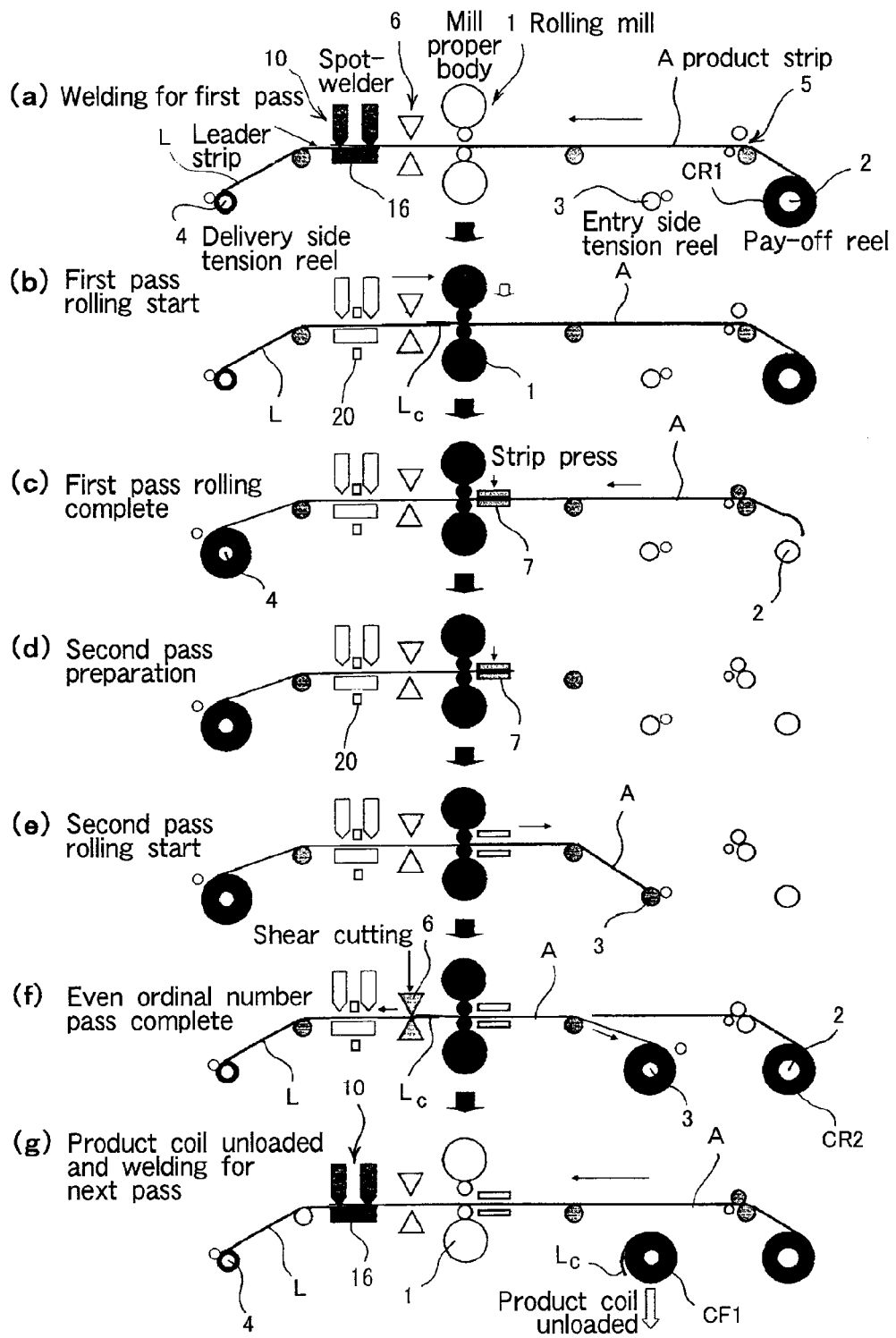
FIG. 1, (a) to (g), is a schematic view for explaining a metal rolling method in order along with a metal rolling system, according to an embodiment of the present invention.
Figure 2:
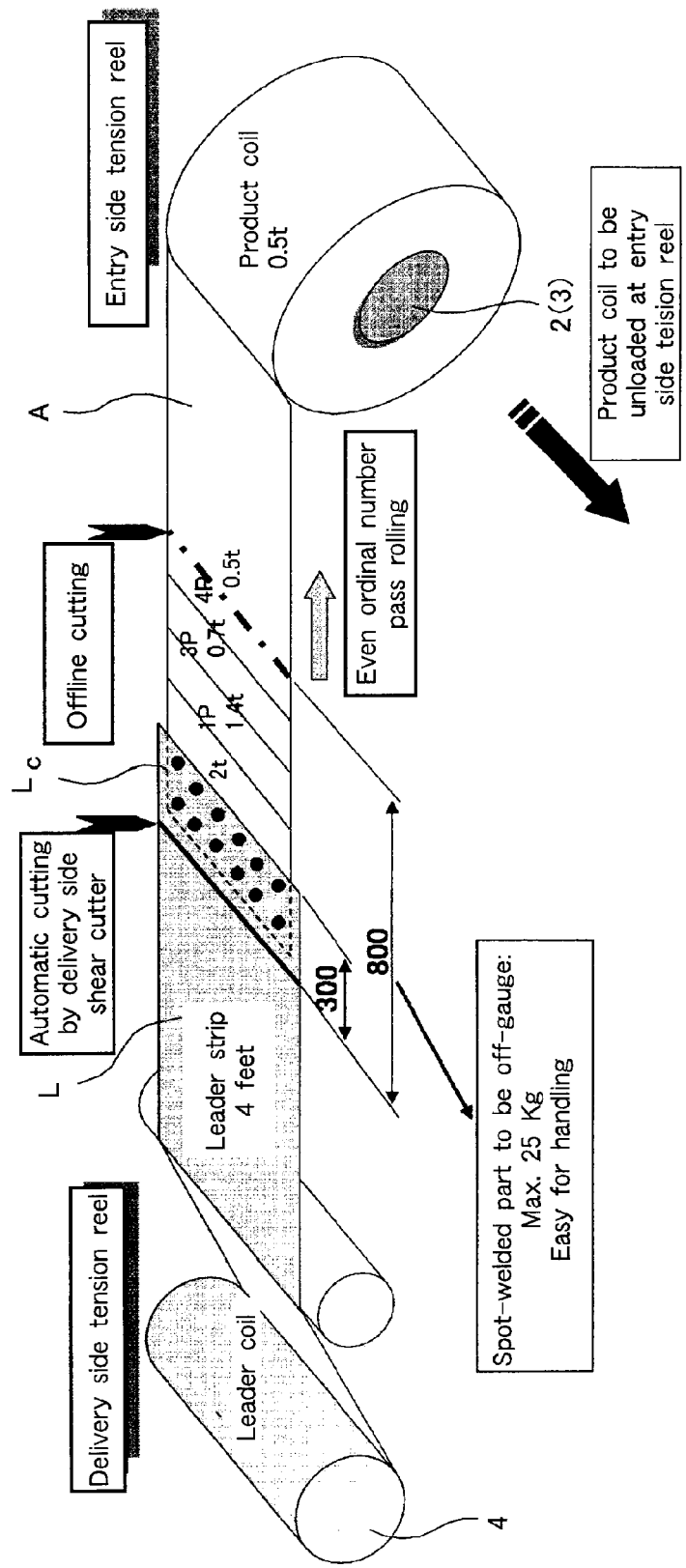
FIG. 2 is a schematic view showing the basic concept of an important portion of the metal rolling method shown in FIG. 1.
Figure 3:
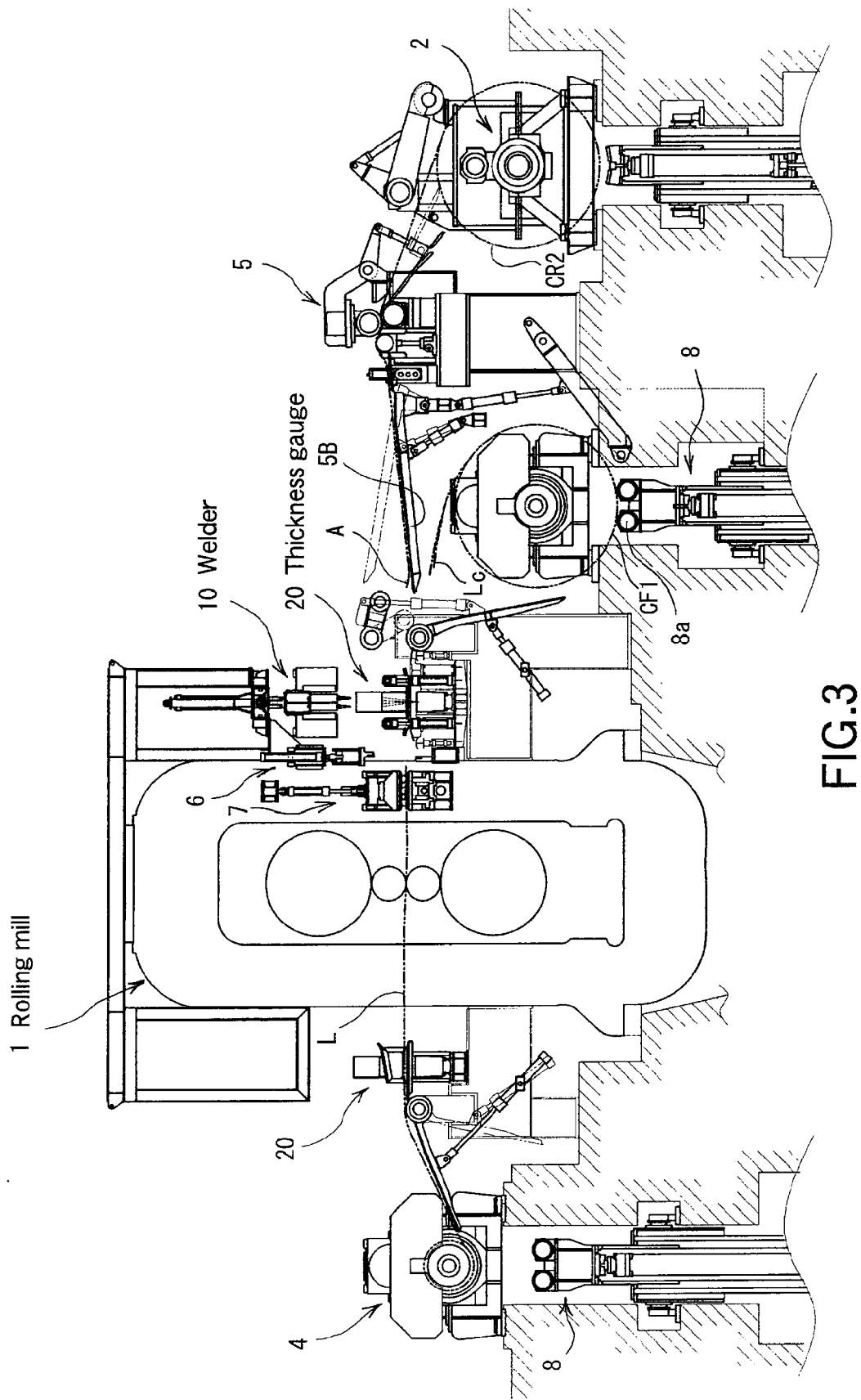
FIG. 3 is a view showing an example of the entire structure of the metal rolling system.
Figure 7:
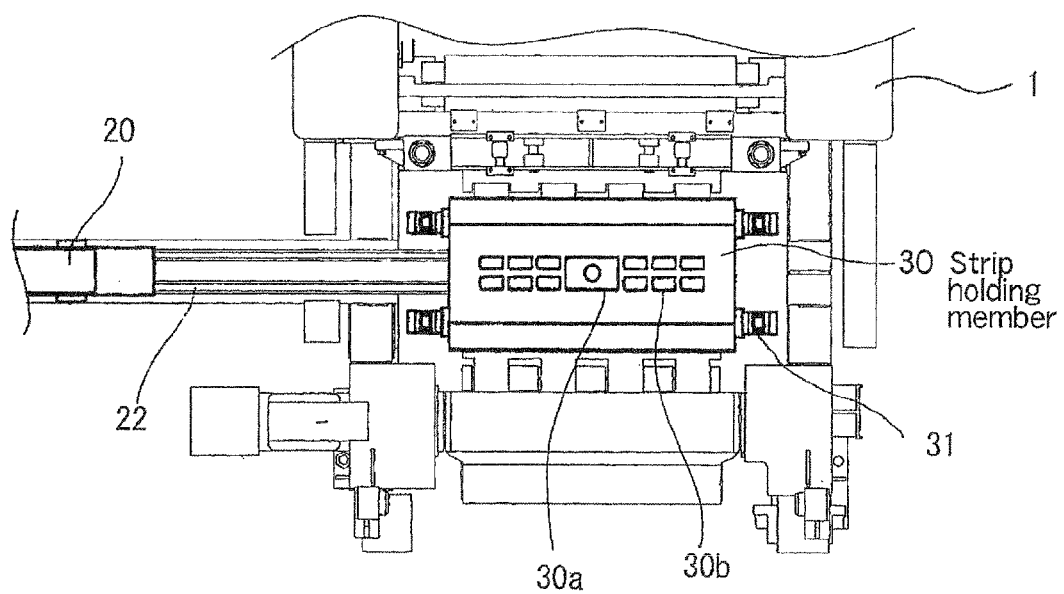
FIG. 7 This is a view taken along a line VII-VII in FIG. 5, (b).
Figure 8:
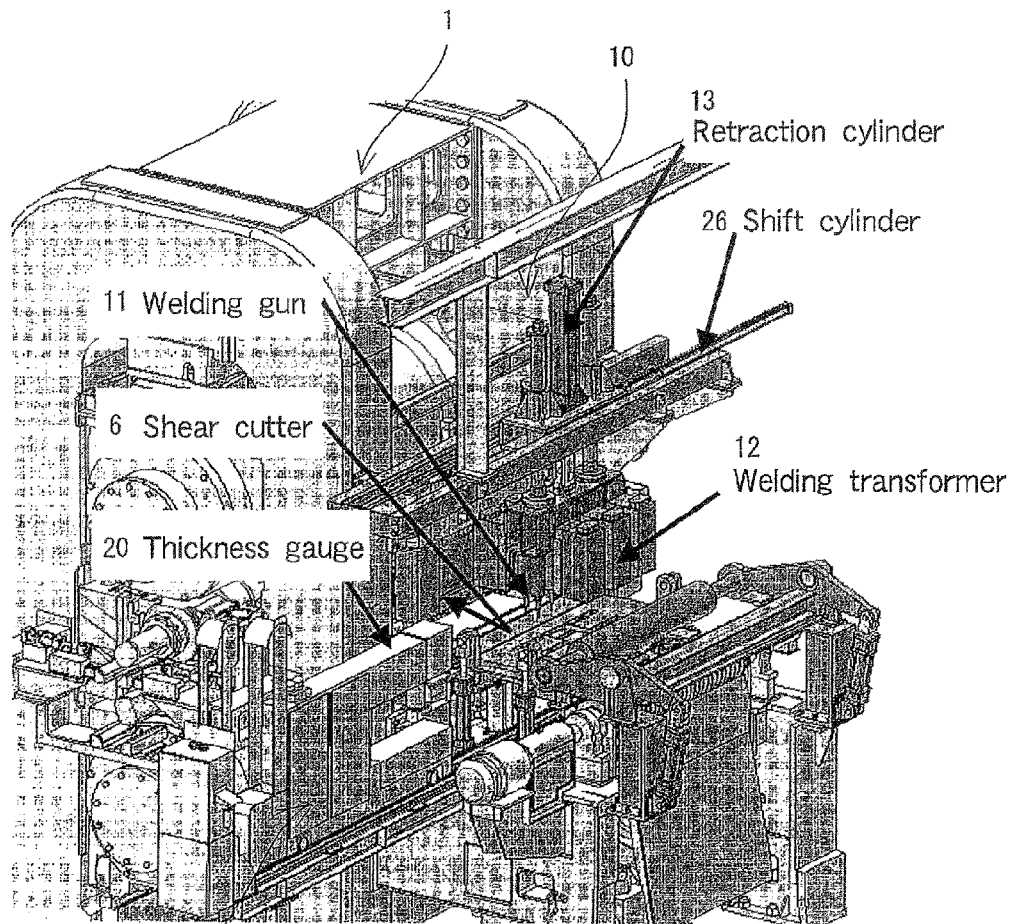
FIG. 8 This is a perspective view showing the welder 10 and so forth along with the rolling mill 1.
Figure 9:
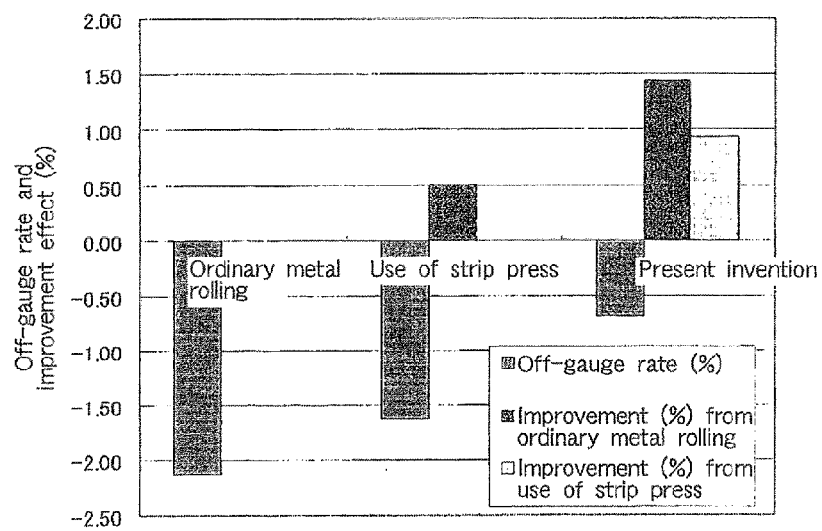
FIG. 9 This is a view for explaining the effect of reducing the part unprocessed by rolling, obtained by a metal rolling method according to the present invention.
Figure 10:
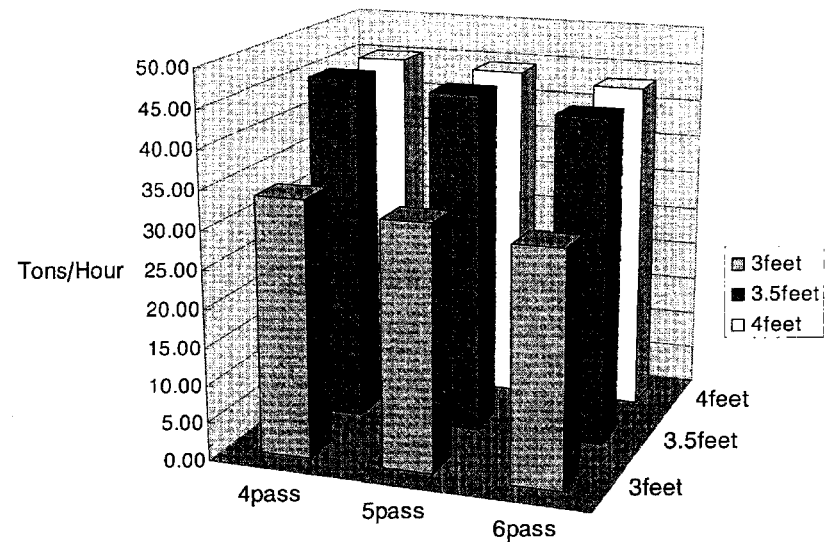
FIG. 10 This is a view showing the amount of production per unit of time (T/H) where the ordinary metal rolling is finished by an even number of passes.
Figure 11:
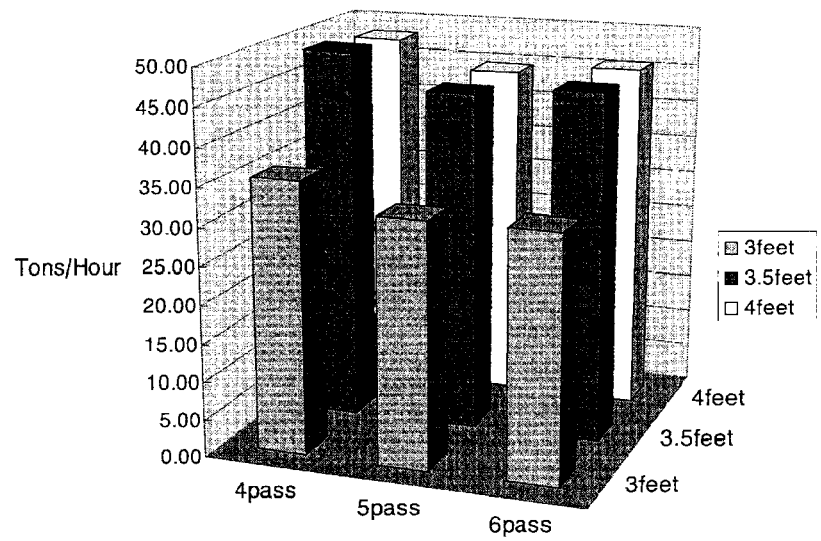
FIG. 11 This is a view showing the amount of production per unit of time (T/H) in comparison between a case where a metal rolling method according to the present invention was applied to rolling finished by four passes and six passes and a case where the ordinary metal rolling is performed by five passes.
Figure 12:
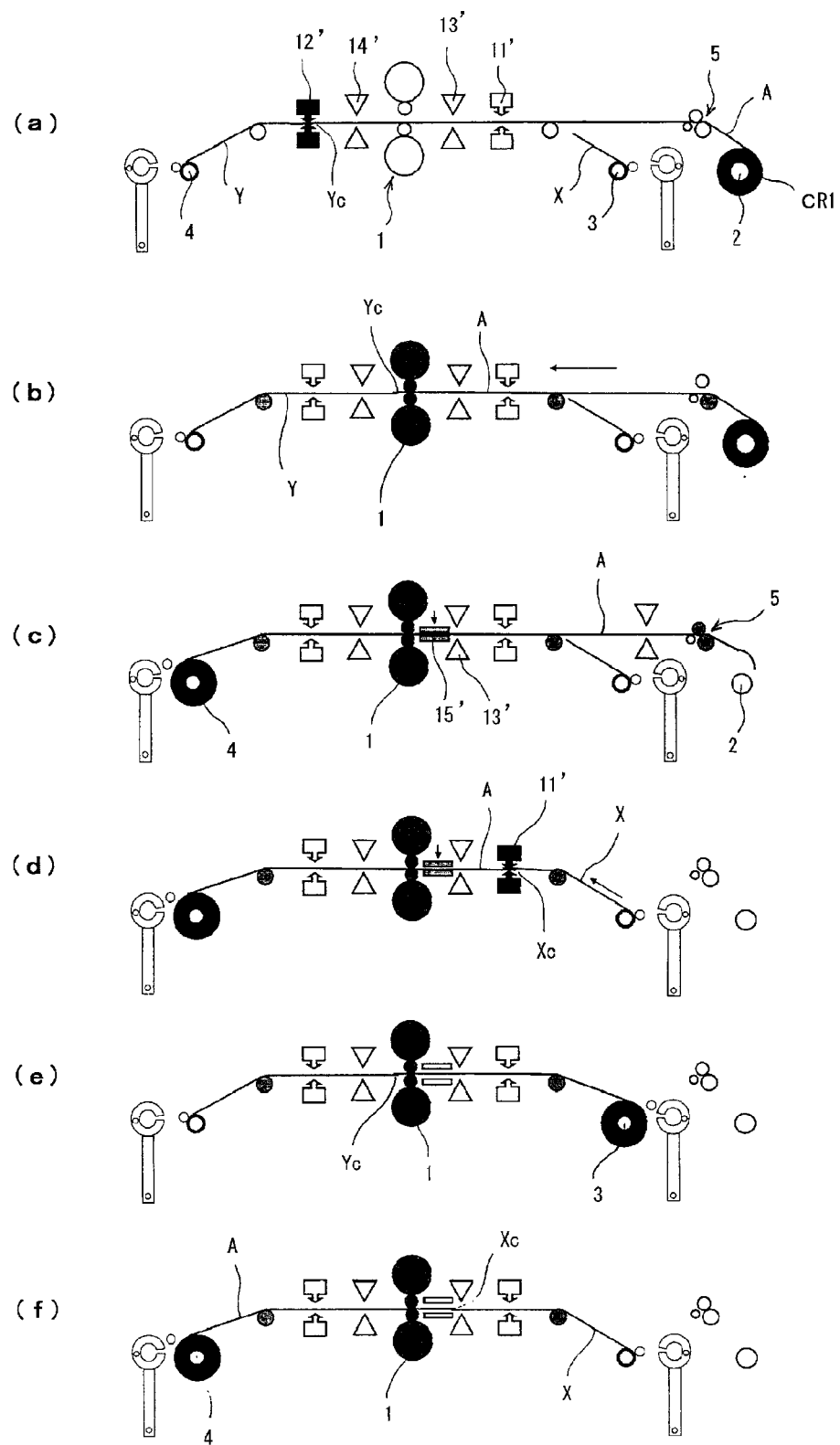
FIG. 12 This is a schematic view showing a metal rolling method disclosed in Patent Document 1, which utilizes a leader strip held by a winder on the delivery side or entry side.

The present invention will now be described with reference to an embodiment shown in FIGS. 1 to 11, in terms of a metal rolling method and metal rolling system for performing cold reversible rolling of ordinary steel. FIG. 1 is a view schematically showing a metal rolling method and metal rolling system, according to an embodiment of the present invention. FIG. 2 is a view showing the basic concept of an important portion of the metal rolling method. FIG. 3 is a view showing an example of the entire structure of the metal rolling system. FIGS. 4 to 7 are detail views showing a welder 10 used in the metal rolling system and the structure around the welder 10. FIG. 8 is a perspective view showing the welder 10 and so forth along with the rolling mill 1. FIGS. 9 to 11 are views for explaining an effect obtained by the metal rolling method and metal rolling system shown in the drawings.

Figure 4:
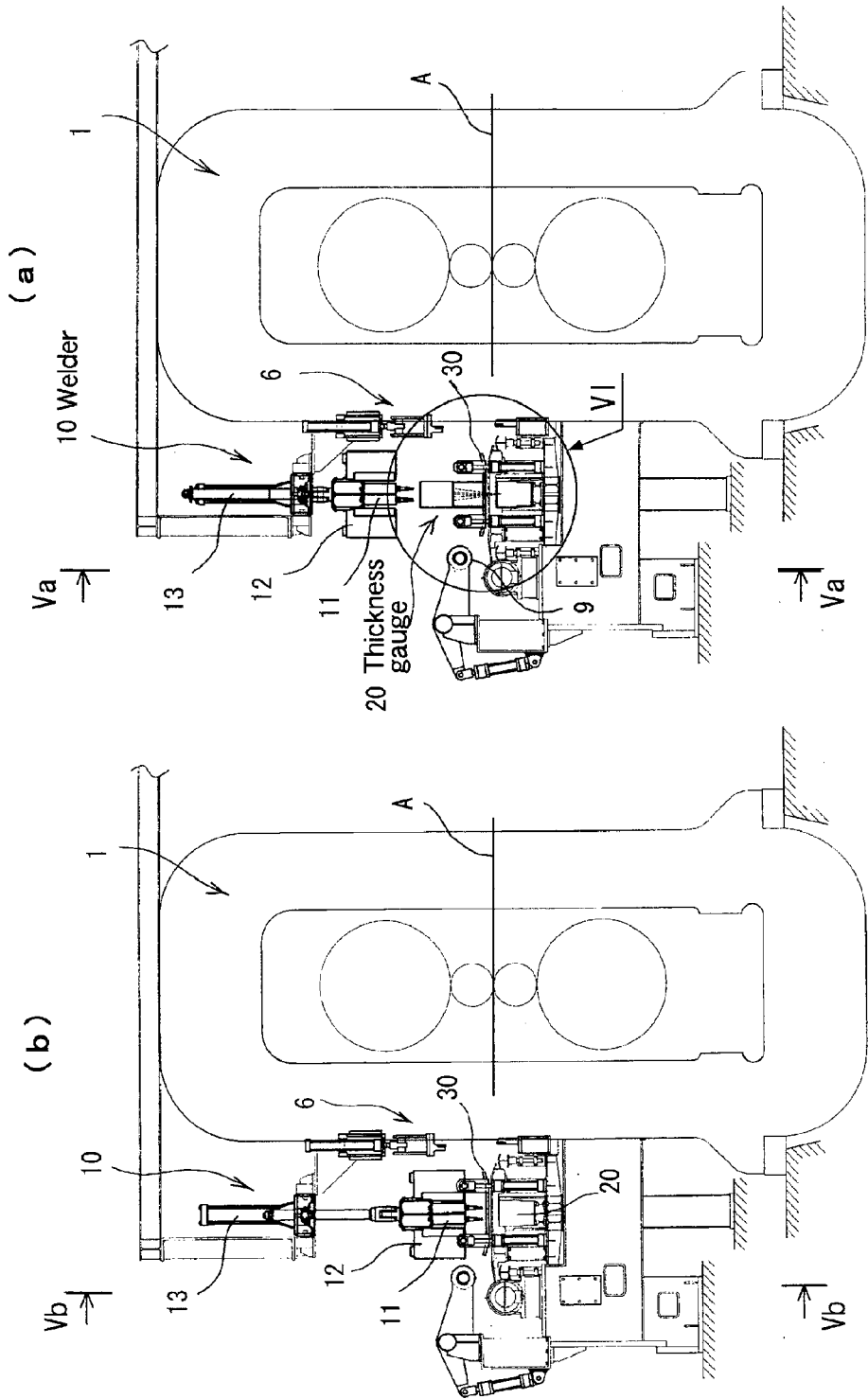
FIG. 4 This is a detail view showing a rolling mill 1, a welder 10, a thickness gauge 20, and a cutter 6, wherein FIG. 4, (a), shows a state where the welding guns 11 and so forth of the welder 10 are retracted upward, and FIG. 4, (b), shows a state where the welding guns 11 and so forth are set closer to a product strip A.

As shown in FIG. 1, this exemplary system comprises a rolling line that includes a rolling mill (mill proper body) 1, a pay-off reel (unwinder) 2, an entry side winder (tension reel) 3, and a delivery side winder (tension reel) 4. The rolling line is further provided with a leveler 5, a cutter (automatic shearing machine or shear) 6, and a strip press 7, along with a welder 10 and a thickness gauge 20. The cutter 6, welder 10, and thickness gauge 20 are disposed at positions between the rolling mill 1 and delivery side winder 4, as shown in FIGS. 1 and 4 (or between the rolling mill 1 and entry side winder 3, as shown in FIG. 3). The welder 10 is formed of a spot-welder (which is shown as an image in FIG. 1 and is shown in detail in FIGS. 4 to 8) configured to perform series welding on two places in the longitudinal direction of rolling at the same time.

According to this system, a metal rolling method is performed such that a leader strip (leader strip) L is held by the delivery side winder 4 and is connected to the front end portion of a product strip (strip to be rolled) A by the welder, and the rolling is finished by an even number of passes. This is conceived to reduce the part unprocessed by rolling (off-gauge part) and thereby improve the yield ratio and increase the productivity.

Specifically, the metal rolling method is performed as shown in FIG. 1, (a) to (g), in accordance with the following sequence.

1) The leader strip L attached to the delivery side winder 4 in advance is welded and connected (at the free end thereof) by the welder 10 to the front end portion of the product strip A supplied from the pay-off reel 2 (FIG. 1, (a)). At this time, the welded part Lc should vary depending on the width of the product strip A, but this embodiment is arranged to perform the series welding described above at twelve places in the strip width direction to provide spot-welding at twenty-four points in total.

2) Then, the welded part Lc is once unwound to a position near the work roll of the rolling mill 1, and a predetermined position is pressed down (at a position on the product strip A near the welded part Lc, which is shown as a position 1P in FIG. 2) (FIG. 1, (b)). After tension is established between the rolling mill 1 and each of the reels 2 and 4, the first pass rolling is started. During the rolling, the thickness of the product strip A is continuously measured and observed by use of the thickness gauge 20.

3) In the first pass, the strip press 7 is used for the rear end side to reduce the off-gauge part, as in the conventionally ordinary metal rolling. In the second pass and thereafter, the rolling is performed while the rear end portion of the product strip A is attached to the entry side winder 3, also as in the conventionally ordinary metal rolling (FIG. 1, (c) to (e)).

4) The rolling of a plurality of passes is performed by sequentially changing the feed direction of the product strip A and using an even ordinal number pass as the final pass. Then, the product strip A is cut by the cutter 6 at a position on the leader strip L excluding the welded part Lc (an "automatic cut" position shown in FIG. 2), and is wound up onto the entry side winder 3 (FIG. 1, (f)).

5) Immediately after the product strip A is wound up onto the entry side winder 3, the next product strip A, which has been prepared such that the strip front edge aligns with the front edge of the delivery table 5B (see FIG. 3), is supplied from the pay-off reel 2, and gets to be welded to the leader strip L, which has been set in wait on the delivery side (FIG. 1, (g)). While the next product strip A is treated on the rolling line with such preparatory operations and the following intended rolling, the preceding product strip A wound up as described above is treated offline with an unloading operation and a separating operation of the welded part Lc. Thereafter, the sequence described above (FIG. 1, (a) to (g)) is repeated on the rolling line, so that a plurality of product strips A are produced one after another.

When the leader strip L becomes too short after repetition of rolling for a number of product strips A, the leader strip is taken out from the delivery side winder. Thereafter, a wider product strip A is processed by rolling of the ordinary type using no leader strip L and finished by an even number of passes, such that part of about 10 m or more (10 to 20 m) of this strip is cut out and left on the delivery side winder 4 at the ending of the final pass. By doing so, this part of about 10 m or more of the product strip A can be used as the leader strip L to subsequently process several tens of product strips A by rolling in accordance with the sequence of 1) to 5) described above, without labor for, e.g., preparing an additional leader strip L and attaching it to the delivery side winder 4.

The important concept of this metal rolling method resides in the following matters a) and b). a) The leader strip L held by the delivery side winder 4 and the front end portion of the product strip A are connected by the spot-welder 10, and the rolling on the product strip A is finished by an even ordinal number pass toward the entry side winder 3. b) The welded part Lc formed by spot-welding is separated from the leader strip L by cutting the leader strip L by the cutter 6 after the ending of the even ordinal number pass rolling, so that the welded part Lc is included in the coil of the product strip A unloaded from the entry side winder 3 and is treated offline.

FIG. 2 is a schematic view showing this concept. In FIG. 2, reference symbols 1P, 3P, and 4P denote the start point or end point of the first, third, and fourth passes, and values, such as "2t" and "1.4t", denote the strip thickness of the respective portions after rolled, as examples. In the case shown in FIG. 2, part with a length of about 800 mm including the welded part Lc becomes the off-gauge part of one product strip A. This part is short and thus light and so it can be easily handled after cut out.

FIG. 3 is a structural view of the metal rolling system, which is schematically shown in FIG. 1, (a) to (g). In FIG. 3, the constituent elements corresponding to those in FIG. 1 are denoted by the same reference symbols. However, unlike the other drawings, FIG. 3 shows the welder 10 as being disposed between the rolling mill 1 and entry side winder 3, because the productivity can be improved even where the welder 10 is disposed on the entry side of the rolling mill 1. Further, in FIG. 3, the cutter 6 is disposed on the entry side of the rolling mill 1. A coil carriage 8 for supporting and unloading the coil of a product strip A is disposed under each of the winders 3 and 4 on the entry side and delivery side. The coil carriage 8 includes cradle rolls 8a attached at the top of an upper elevating stage, so that the coil supported thereon can be rotated to feed out the welded part Lc at the end portion to a position where it can be easily cut by a hand cutter.

Figure 5:
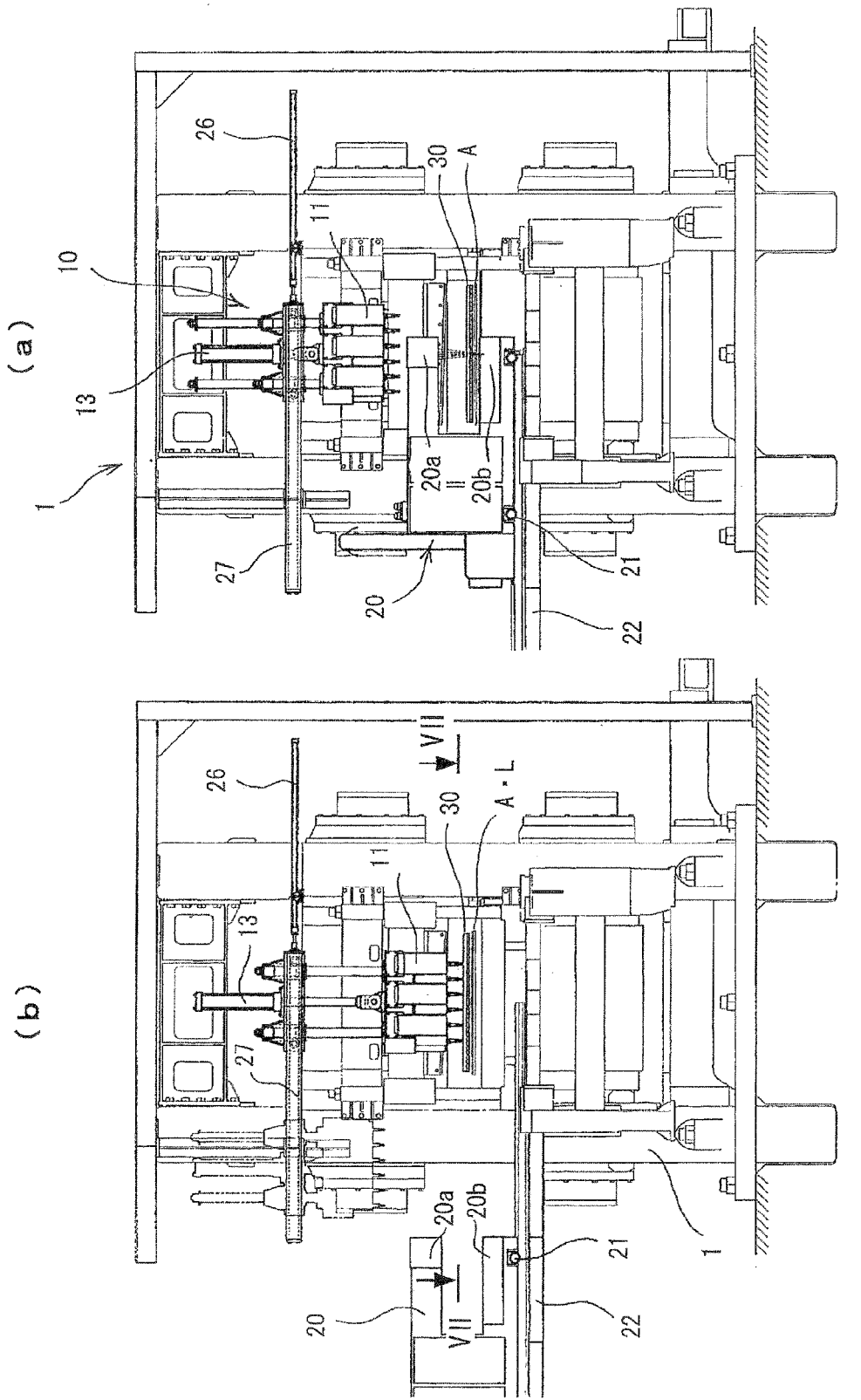
FIG. 5 This is a detail view showing the rolling mill 1, welder 10, and thickness gauge 20, wherein FIG. 5, (a), shows a portion taken along a line Va-Va in FIG. 4, (a), and FIG. 5, (b), shows a portion taken along a line Vb-Vb in FIG. 4, (b).

FIGS. 4 and 5 are detail views showing the rolling mill 1 along with the welder 10, thickness gauge 20, and cutter 6 disposed at positions adjacent thereto (on the delivery side). FIG. 4, (a), shows a state where the welding guns 11 and so forth of the welder 10 are separated and retracted upward from the product strip A, while the thickness gauge 20 is set closer to the product strip A and is used to measure the thickness thereof. FIG. 4, (b), shows a state where the thickness gauge 20 is retracted sideward from the product strip A, while the welding guns 11 and so forth are set closer to the product strip A. FIG. 5, (a), shows a portion taken along a line Va-Va in FIG. 4, (a), and FIG. 5, (b), shows a portion taken along a line Vb-Vb in FIG. 4, (b).

As described above, the welder 10 is formed of a spot-welder configured to perform series welding. As shown in FIG. 4, above the pass line of the product strip A, the welding guns 11 each including an electrode provided with a pressing device and a electric feeder member for the same are disposed along with transformers (electrical transformers) 12 and an elevator (retraction cylinder) 13 for the welding guns 11. The welding guns 11 are configured to plunge the electrode by driving an air cylinder. Twelve welding guns 11 of this type are arrayed to form two rows in the rolling direction and six rows in the width direction and are connected to six transformers 12, so as to apply welding in two rows in the rolling direction by series welding. The welding guns 11 (specifically the driving electromagnetic valves thereof) and transformers 12 are structured such that machine parts and electric parts are contained in respective casings that are purged with air to protect the parts from water drops and vapor generated from a rolling coolant.

The welding guns 11 and transformers 12 can be moved up and down by the elevator 13 between a retracted position shown in FIG. 4, (a), separated upward from the line of the product strip A and an operating position shown in FIG. 4, (b). Further, the entire structure including the welding guns 11 and elevator 13 can be shifted sideward (toward the driving side of the rolling line) by a shifting mechanism including a shift cylinder 26 and a guide member 27 shown in FIG. 5.

Figure 6:
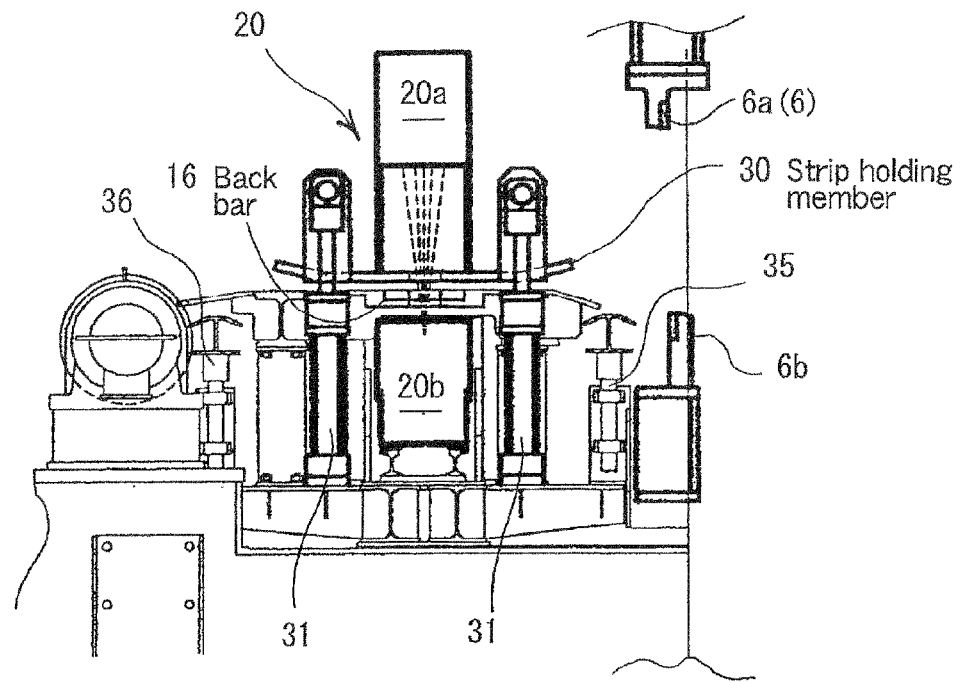
FIG. 6 This is a detail view showing a portion VI in FIG. 4, (a).

On the other hand, as shown in FIG. 6, a back bar 16 indispensable for series welding, which is made of highly conductive chromium-copper, is fixedly disposed immediately below the pass line. Since liquid, such as the rolling coolant, flows down under the pass line, the components of the welder 10 are arranged such that only the back bar 16 is present below the pass line and the other components are present above the pass line.

When the leader strip L and product strip A are welded to each other, the welding guns 11 arrayed in six rows as described above are first used to apply spot-welding (series welding) on six places (twelve points) at one time, and then they are shifted sideward by several tens of millimeters (in the width direction) by the shift cylinder and used to apply welding on other six places (twelve points). By doing so, the end portion of the product strip A is welded to the leader strip L at twelve places (twenty-four points) that form two rows in the longitudinal direction of rolling.

The thickness gauge 20 is formed of an X-ray thickness gauge (or it may be γ-ray or β-ray thickness gauge), and includes an emitter 20a and a receiver 20b respectively attached to the upper and lower portions of a C-shaped frame, as shown in FIG. 5, (a). The emitter 20a and receiver 20b are configured to sandwich the product strip A and measure the thickness of the product strip A by use of X-rays. The thickness gauge 20 can be moved by wheels 21 attached to the frame and rails 22 extending sideward (toward the driving side of the rolling line), between an operating position (FIG. 5, (a)) to sandwich the product strip A and measure the thickness thereof and a retracted position (FIG. 5, (b)) shifted sideward therefrom.

In order to make a compact arrangement of the welder 10 and thickness gauge 20, the operating position of the thickness gauge 20 to measure the thickness overlaps with the operating position of the welding guns 11 moved down to apply welding on the product strip A (the positions of their center lines in the rolling direction align with each other). However, the thickness gauge 20 measures the thickness of the product strip A while the product strip A is being fed and subjected to rolling. On the other hand, the welding guns 11 apply welding on the product strip A when the feed of the product strip A is stopped. Accordingly, they perform measurement and welding infallibly with different timings at their operating positions described above. When they are not used for measurement or welding, they are moved to their retracted positions described above, which are separated from the product strip A. In a state where the welding guns 11 have been moved up to the retracted position or have been shifted sideward, they can be subjected to maintenance operations, such as replacement of the electrodes. In a state where the thickness gauge 20 has been retracted sideward, it can be subjected to calibration operations (such as zero point adjustment).

As shown in FIG. 6, a strip holding member 30 for pressing the product strip A in welding is disposed immediately above the pass line that is in contact with the upper surface of the back bar 16. The strip holding member 30 is formed of a flat plate with the front and rear end portions slightly inclined upward and can be moved by elevating cylinders 31. When the thickness gauge 20 measures the thickness of the product strip A, the strip holding member 30 is set at the upper position and serves to protect the thickness gauge 20. As shown in FIG. 7, the strip holding member 30 has a hole 30a and holes 30b formed therein wherein the hole 30a allows X-rays of the thickness gauge 20 to pass through and the holes 30b allow the electrodes of the welding guns 11 to pass through. Further, the back bar 16 formed of a flat plate fixed below the pass line has a hole at the center to allow X-rays of the thickness gauge 20 to pass through.

As shown in FIG. 6, other elevating cylinders 35 and 36 are respectively disposed on the front and rear sides of the strip holding member 30. These cylinders are used to move up one of the end portions of the product strip A and leader strip L to prevent them from bumping into each other when the end portions are overlapped before they are connected by welding.

In FIG. 6, reference symbols 6a and 6b respectively denote the upper blade and lower blade of the cutter 6. Further, in FIG. 4, a reference symbol 9 denotes a pressing roll for the product strip A.

FIG. 8 is a perspective view showing the structure and positional relationship of the welder 10, thickness gauge 20, and so forth described above, viewed from the driving side of the rolling line or the delivery side of the rolling mill 1. As shown in FIG. 8, the welder 10 and thickness gauge 20 are arranged compact to minimize the occupancy space in the rolling line direction.

As regards the welding performed by the welder 10 to connect the end portion of the product strip A to the leader strip L, a test was conducted in advance on a pilot line (not shown) in terms of the strength and durability of the welded part Lc. In this test, the number of welding places necessary for a strip having a width of 900 mm was obtained in light of winding, unwinding, and tensile strength. Table 1 shows results of this test.

TABLE 1

|  | Leader strip thickness 2.3 t | Leader strip thickness 1.6 t | Leader strip thickness 1.2 t | Leader strip thickness 0.8 t | (Leader strip thickness 0.5 t) |
|---|---|---|---|---|---|
| (Product strip 0.8 t) |  |  |  |  | 12 |
| Product strip 1.6 t | 8 | 8 | 5 | 8 | 9 |
| Product strip 2.3 t | 10 | 8 | 6 | 10 |  |
| Product strip 3.2 t | 12 | 10 | 8 | 12 |  |

In this test, the necessary rolling tension was set at 60 kN on the premise that a taper tension was adopted in some of the passes. As shown in Table 1, this requirement can be satisfied by twelve places (twenty-four points) or more in any of the cases.

Further, in order to confirm the weld strength obtained by use of a rolling oil intervening therein, a test was conducted with a gear oil applied by a brush, but no deterioration of the weld strength was observed. It is thought that this was so because oil part was burned out in an instant by a welding arc.

FIG. 9 is a view for explaining the effect of reducing the part unprocessed, according to the present invention. In FIG. 9, the left part shows an off-gauge rate obtained by the ordinary metal rolling using no leader strip (the conventional rolling performed without a leader strip will be referred to as "ordinary metal rolling"). The central part shows an off-gauge rate (on the lower side) and an improvement effect (on the upper side), both obtained by solely using a strip press. The right part shows an off-gauge rate (on the lower side) and an improvement effect (on the upper side), both obtained by use the system and method described above. In the case shown in the right part, there was rendered an off-gauge rate of 0.7% along with an improvement of 1.4% relative to the ordinary metal rolling and with an improvement of 0.9% relative to the ordinary metal rolling using the strip press. In this case, if a metal rolling system provides an annual production of 250,000 tons, it is possible to save a hot coil by 2,250 tons to 3,500 tons per year; which is a remarkable merit. Further, since the rolling is performed with tension given from the front edge, the method described above excels the other off-gauge reducing methods in strip feed stability, strip thickness accuracy, and strip shape.

Table 2 shows measurement results concerning the process time (excluding the rolling time) per unit coil of the product strip A.

TABLE 2

|  | Ordinary metal rolling (Prior art) | | Zoom metal rolling (Present invention) Unit in Minute | |
|---|---|---|---|---|
| Pass No. | Coil Change, Threading | Set-up, Coolant Spray | Coil Change, Threading | Set-up, Coolant Spray |
| 1 | 0.9 | 0.3 | 1.3 | 0.3 |
| 2 | 0.9 | 0.3 | 0.9 | 0.3 |
| 3 | 0 | 0.3 | 0 | 0.3 |
| 4 | 0 | 0.3 | 0 | 0.3 |
| 5 | 0 | 0.3 | 0 | 0.3 |
| 6 | 2.1 | 0.3 | 0 | 0.3 |
| Total | 3.9 | 1.8 | 2.2 | 1.8 |
|  | 5.7 | | 4.0 | |

As shown in Table 2, according to the metal rolling method described above, it is not necessary to wait for a rolled coil to be taken off the line, and it is not necessary to feed the next product strip A and wind it around the delivery side winder 4 by several turns. Consequently, as compared with the ordinary metal rolling performed without a leader strip, the metal rolling method described above shortens the process time (excluding the rolling time) per unit coil, even if it takes time to perform spot-welding. Further, since a small coil (Pup coil) formed of part unprocessed by rolling is not generated, it is possible to save a labor conventionally required to take out such a small coil by strapping it with a band.

FIGS. 10 and 11 show production capacity obtained where the rolling of a product strip A was finished by an even number of passes. FIG. 10 is a view showing the average gauge of product for respective strip widths in a steel plant by the amount of production per unit of time (T/H) where the ordinary metal rolling is finished by four passes, five passes, and six passes. As shown in FIG. 10, even with the same workload, the productivity is lowered along with the increase in the number of passes because of the pass switching and the increase and decrease in speed FIG. 11 is a view comparing a case where the metal rolling method described above was given to rolling finished by four passes and six passes and a case where the ordinary metal rolling is performed by five passes. As shown in FIG. 11, where the method described above was applied, the rolling using four passes rendered a further improvement in productivity, and even the rolling using six passes rendered an improvement in productivity due to a shorter process time per unit coil as compared with the ordinary metal rolling using five passes.

Judging from these matters, where the method described above is applied, it is expected to improve the productivity by about 10% in rolling using four passes and by about 2% in rolling using six passes. However, where an even number of passes is used in actual running operations, it is not acceptable to decrease the number of passes in all of them but it is necessary to increase the number of passes in about a half of them. In consideration of this, where a mill provides an annual production of 250,000 tons, it is estimated to improve the productivity by 6% by use of the metal rolling method described above such that the running time is 5,096 hours per year as compared with 5,402 hours per year of the ordinary metal rolling. In other words, a metal rolling method according to the present invention is expected not only to reduce the part unprocessed by rolling (an improvement in yield ratio) but also to improve the productivity.

INDUSTRIAL APPLICABILITY

A welder for a metal rolling system, a metal rolling system, and a metal rolling method according to the present invention are industrially applicable to rolling techniques performed while causing a product strip (strip to be rolled or the like) to pass back and forth.

The invention claimed is:

1. A metal rolling system comprising a rolling mill, a first winder disposed on an entry side of the rolling mill, a second winder disposed on a delivery side of the rolling mill, a welder, and a cutter, wherein the welder and the cutter are disposed between the rolling mill and the second winder or between the rolling mill and the first winder such that the welder is closer to the second winder than the cutter, wherein the metal rolling system is configured to roll a product strip while causing the product strip to pass through the rolling mill back and forth along a pass line, the pass line being defined as a passage route of the product strip, and wherein the metal rolling system is configured to perform functions comprising:
welding, by the welder, a leader strip held by the second winder to an end portion of the product strip, and subjecting the product strip to reversible rolling by the rolling mill without rolling the leader strip and a welded part of the product strip which is welded to the leader strip, while providing tension from the second winder through the leader strip to the product strip including near the end portion of the product strip; and
cutting, by the cutter, the leader strip at a position outside of the welded part, and winding up the product strip including the welded part at the end portion of the product strip onto the first winder without cutting out the welded part, followed by unloading a coil of the product strip having been wound up.

2. The metal rolling system according to claim 1, wherein the welder comprises a spot-welder which includes a back bar disposed below the pass line and welding guns disposed above the pass line to perform series welding for welding a plurality of points at one time.

3. The metal rolling system according to claim 2, wherein the back bar is fixedly disposed below the pass line, and the welding guns are disposed along with an electrical transformer and an elevator for the welding guns above the pass line, and
the welding guns are arranged to apply welding on the plurality of points distributed at two or more positions in a longitudinal direction of the product strip.

4. The metal rolling system according to claim 2, wherein the welding guns are retractable to a position distant from the pass line when performing no welding, and
a thickness gauge configured to measure a thickness of the product strip is disposed to perform measurement near the pass line and is retractable to a position distant from the pass line when performing no measurement, with such a positional relationship that a position of the thickness gauge for performing the measurement at least partly overlaps with a position of the welding guns for performing the welding.

5. The metal rolling system according to claim 1, wherein the welder and the cutter are disposed only between the rolling mill and the second winder.

6. The metal rolling system according to claim 1, wherein the system is configured to perform said cutting the leader strip at a position out of the welded part at an ending of an even ordinal number pass toward the first winder.

7. A metal rolling method for rolling a product strip by use of a rolling mill and winders disposed respectively on an entry side and a delivery side of the rolling mill while causing the product strip to pass through the rolling mill back and forth along a pass line, the pass line being defined as a passage route of the product strip, and the method comprising:
welding a leader strip held by the winder on the delivery side to an end portion of the product strip, and subjecting the product strip to reversible rolling by the rolling mill without rolling the leader strip and a welded part of the product strip to the leader strip, while providing tension from the winder on the delivery side through the leader strip to the product strip including near the end portion of the product strip; and
cutting the leader strip at a position outside of the welded part at an end of an even ordinal number pass toward the winder on the entry side, and winding up the product strip including the welded part at the end portion onto the winder on the entry side without cutting out the welded part, followed by unloading a coil of the product strip having been wound up.

8. The metal rolling method according to claim 7, wherein the method comprises performing said welding the leader strip to the end portion of the product strip and said cutting the leader strip thereafter by a welder and a cutter disposed between the rolling mill and the winder on the delivery side or between the rolling mill and the winder on the entry side.

9. The metal rolling method according to claim 8, wherein, after said cutting the leader strip and said winding up the product strip onto the winder on the entry side and before cutting out the welded part from the coil of the product strip, the method comprises feeding another product strip from a pay-off reel on the entry side toward the delivery side.

10. The metal rolling method according to claim 8, wherein, after sequentially subjecting a plurality of product strips one by one to said reversible rolling and said unloaded while using the same leader strip, and then once taking out the leader strip from the winder on the delivery side, the method comprises:
holding an end portion of one product strip directly by the winder on the delivery side without using a leader strip, and subjecting said one product strip to reversible rolling by the rolling mill while giving tension from the winders; and
cutting said one product strip held by the winder on the delivery side at an ending of an even ordinal number pass toward the winder on the entry side, thereby obtaining from said one product strip a leader strip to be used for another plurality of product strips subsequently subjected to rolling.

11. The metal rolling method according to claim 8, wherein the method comprises performing said welding by a spot-welder that comprises a back bar disposed below the pass line and welding guns disposed above the pass line to perform series welding for welding a plurality of points at one time.

12. The metal rolling method according to claim 8, wherein the welder and the cutter are disposed only between the rolling mill and the winder on the delivery side.

13. The metal rolling method according to claim 7, wherein, after said cutting the leader strip and said winding up the product strip onto the winder on the entry side and before cutting out the welded part from the coil of the product strip, the method comprises feeding another product strip from a pay-off reel on the entry side toward the delivery side.

14. The metal rolling method according to claim 13, wherein, after sequentially subjecting a plurality of product strips one by one to said reversible rolling and said unloaded while using the same leader strip, and then once taking out the leader strip from the winder on the delivery side, the method comprises:
   holding an end portion of one product strip directly by the winder on the delivery side without using a leader strip, and subjecting said one product strip to reversible rolling by the rolling mill while giving tension from the winders; and
   cutting said one product strip held by the winder on the delivery side at an ending of an even ordinal number pass toward the winder on the entry side, thereby obtaining from said one product strip a leader strip to be used for another plurality of product strips subsequently subjected to rolling.

15. The metal rolling method according to claim 13, wherein the method comprises performing said welding by a spot-welder that comprises a back bar disposed below the pass line and welding guns disposed above the pass line to perform series welding for welding a plurality of points at one time.

16. The metal rolling method according to claim 7, wherein, after sequentially subjecting a plurality of product strips one by one to said reversible rolling and said unloaded while using the same leader strip, and then once taking out the leader strip from the winder on the delivery side, the method comprises:
   holding an end portion of one product strip directly by the winder on the delivery side without using a leader strip, and subjecting said one product strip to reversible rolling by the rolling mill while giving tension from the winders; and
   cutting said one product strip held by the winder on the delivery side at an ending of an even ordinal number pass toward the winder on the entry side, thereby obtaining from said one product strip a leader strip to be used for another plurality of product strips subsequently subjected to rolling.

17. The metal rolling method according to claim 16, wherein the method comprises performing said welding by a spot-welder that comprises a back bar disposed below the pass line and welding guns disposed above the pass line to perform series welding for welding a plurality of points at one time.

18. The metal rolling method according to claim 7, wherein the method comprises performing said welding by a spot-welder that comprises a back bar disposed below the pass line and welding guns disposed above the pass line to perform series welding for welding a plurality of points at one time.

* * * * *